(12) United States Patent
Duplessis et al.

(10) Patent No.: US 7,757,227 B2
(45) Date of Patent: Jul. 13, 2010

(54) DYNAMIC MULTILINGUAL RESOURCE SUPPORT FOR APPLICATIONS

(75) Inventors: Jean-Pierre Duplessis, Redmond, WA (US); Srivinas Raghu Gatta, Redmond, WA (US); William N. Hanlon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1352 days.

(21) Appl. No.: 11/083,797

(22) Filed: Mar. 18, 2005

(65) Prior Publication Data

US 2006/0210026 A1 Sep. 21, 2006

(51) Int. Cl.
G06F 3/00 (2006.01)
G06F 9/44 (2006.01)
G06F 9/445 (2006.01)
G06F 17/20 (2006.01)

(52) U.S. Cl. .................. 717/173; 717/168; 717/171; 717/174; 717/176; 717/177; 717/178; 715/703; 704/8

(58) Field of Classification Search .................. None
See application file for complete search history.

(56) References Cited

U.S. PATENT DOCUMENTS

| | | | |
|---|---|---|---|
| 5,664,206 A * | 9/1997 | Murow et al. .................. 704/8 |
| 6,339,755 B1 * | 1/2002 | Hetherington et al. ......... 704/8 |
| 6,859,820 B1 | 2/2005 | Hauduc et al. |
| 6,904,401 B1 * | 6/2005 | Hauduc et al. .................. 704/8 |
| 7,257,527 B2 * | 8/2007 | Ertemalp et al. ............... 704/2 |
| 2003/0182632 A1 * | 9/2003 | Murdock et al. ............ 715/536 |
| 2004/0230416 A1 | 11/2004 | Ye et al. |
| 2005/0044065 A1 * | 2/2005 | McArdle ....................... 707/3 |

* cited by examiner

*Primary Examiner*—Insun Kang
(74) *Attorney, Agent, or Firm*—Marshall, Gerstein & Borun LLP

(57) ABSTRACT

A download component queries a computer containing an application for requesting resources to determine languages associated with the computer. The download component then accesses the remote database and conducts a match between the queried languages on the computer and available languages in the database. The download component then downloads resources for each of the matched languages and a default language, such as English. A smart query module associated with the application on the computer is provided for choosing language resource files for the application. An algorithm is provided for choosing a language resource based upon user default settings and available resources, with a fall back to a default language, e.g., English.

9 Claims, 6 Drawing Sheets

DYNAMIC MULTILINGUAL RESOURCE SUPPORT FOR APPLICATIONS

FIELD OF THE INVENTION

This invention pertains generally to computer systems and, more particularly, to providing and displaying a particular language on a computer system.

BACKGROUND OF THE INVENTION

Software is often developed with many different resources (e.g., strings and/or images) to support localization, i.e., language and/or regional preferences. Example regional preferences, or locales, for a language may be the United States, Great Britain, Australian, and Canadian versions of the English language. Presently, for each software program, a separate binary is built for each different set of localized preferences. Thus, a software developer ships a binary for each and every language and perhaps separate binaries for different regional preferences for a particular language. If separate regional preferences are not supported, the resources may be fixed for a single language and thus may not reflect regional differences.

Tying the localized resources to a particular binary can create other problems. If two binaries utilize the same resource, each must carry the same resource as part of that binary, causing code bloat. In addition, the localized resources listed with a binary may become stale and cannot be updated unless the entire binary is updated. Finally, it may be difficult for a developer to access the correct binary or resources even if the above problems were removed.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, applications are architected having separate components. The components include a business logic module that handles non-user interface components of the application. A localization module deals with localization aspects of the application, such as the user interface logic. The language and/or regional resources are separated from the localization module, and may, for example, be stored in language resource files in a remote database.

In accordance with an embodiment, a download component queries a computer containing an application for requesting resources to determine languages associated with the computer. The download component then accesses the remote database and conducts a match between the queried languages on the computer and available languages in the database. The download component then downloads resources for each of the matched languages and a default language, such as English.

In accordance with an embodiment, a smart query module associated with the application on the computer is provided for choosing language resource files for the application. An algorithm is provided for choosing a language resource file based upon user default settings and available resources, with a fall back to a default language, e.g., English.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
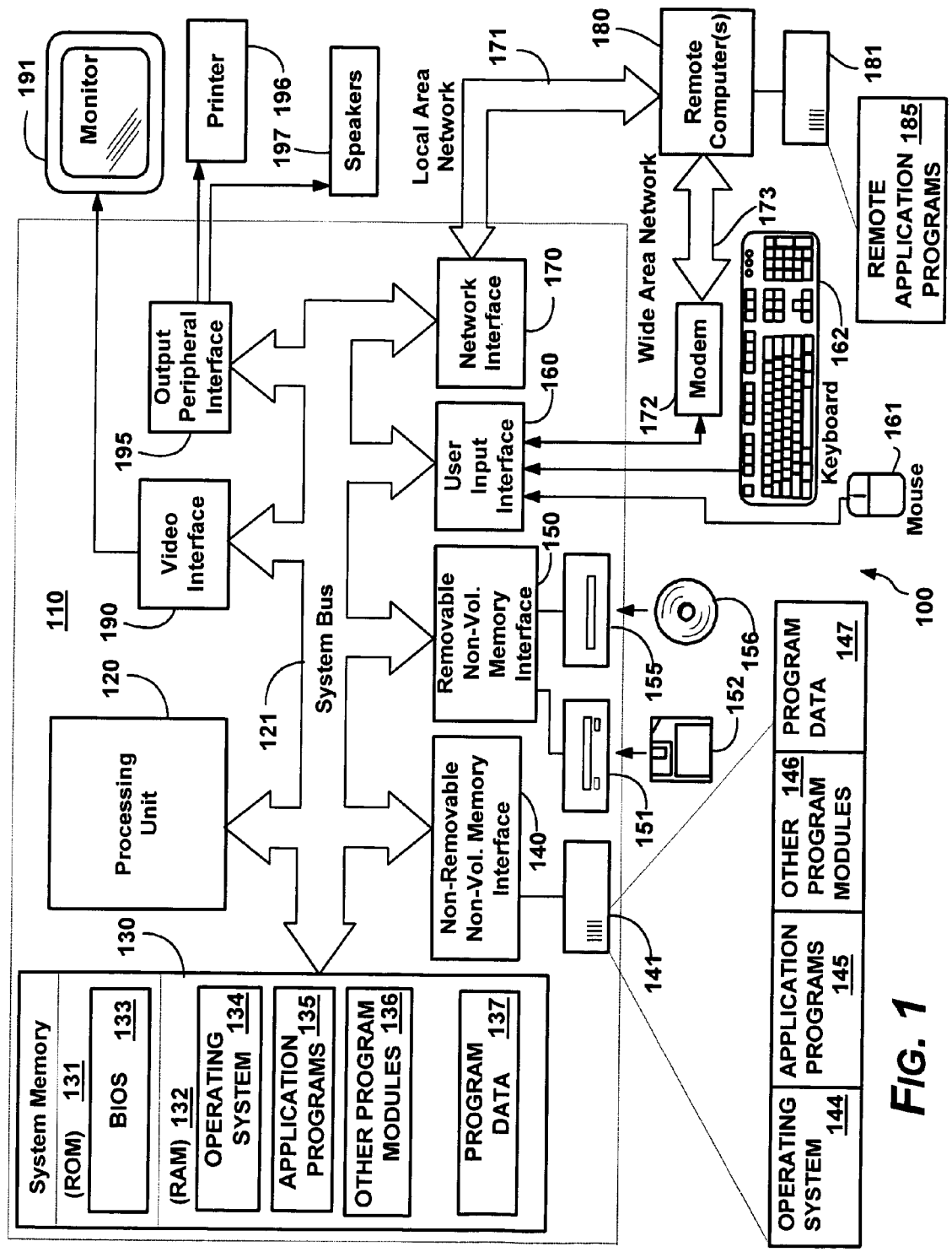
FIG. 1 is a schematic diagram generally illustrating an exemplary computer system usable to implement an embodiment of the invention.

Referring now to the drawings, in which like reference numerals represent like parts throughout the several views, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. In a wireless environment, the network interface is often a wireless network interface card (NIC), although other wireless connection hardware may be used. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In accordance with an embodiment, a language file is provisioned to a computer for use by an application on the computer. The language file may be provided, for example, by a provisioning service, such as the provisioning service described in United States Published Application Number US2004/0111540 A1, filed Dec. 6, 2002 and published Jun. 10, 2004, entitled "Increasing the Level of Automation When Provisioning a Computer System to Access a Network," and owned by the assignee of the present invention. Although the method of provisioning a computer system in this application is well described in the application, a brief high-level description is given here for the benefit of the reader.

In general, the provisioning features described in the 2004/0111520 published application are directed to permitting a computer system to authenticate with a server to gain authorization to access a second network. The computer system is given authorization to access a first network for at least the purpose of downloading files (e.g., sign-up and configuration files) needed to access the second network.

Figure 2:
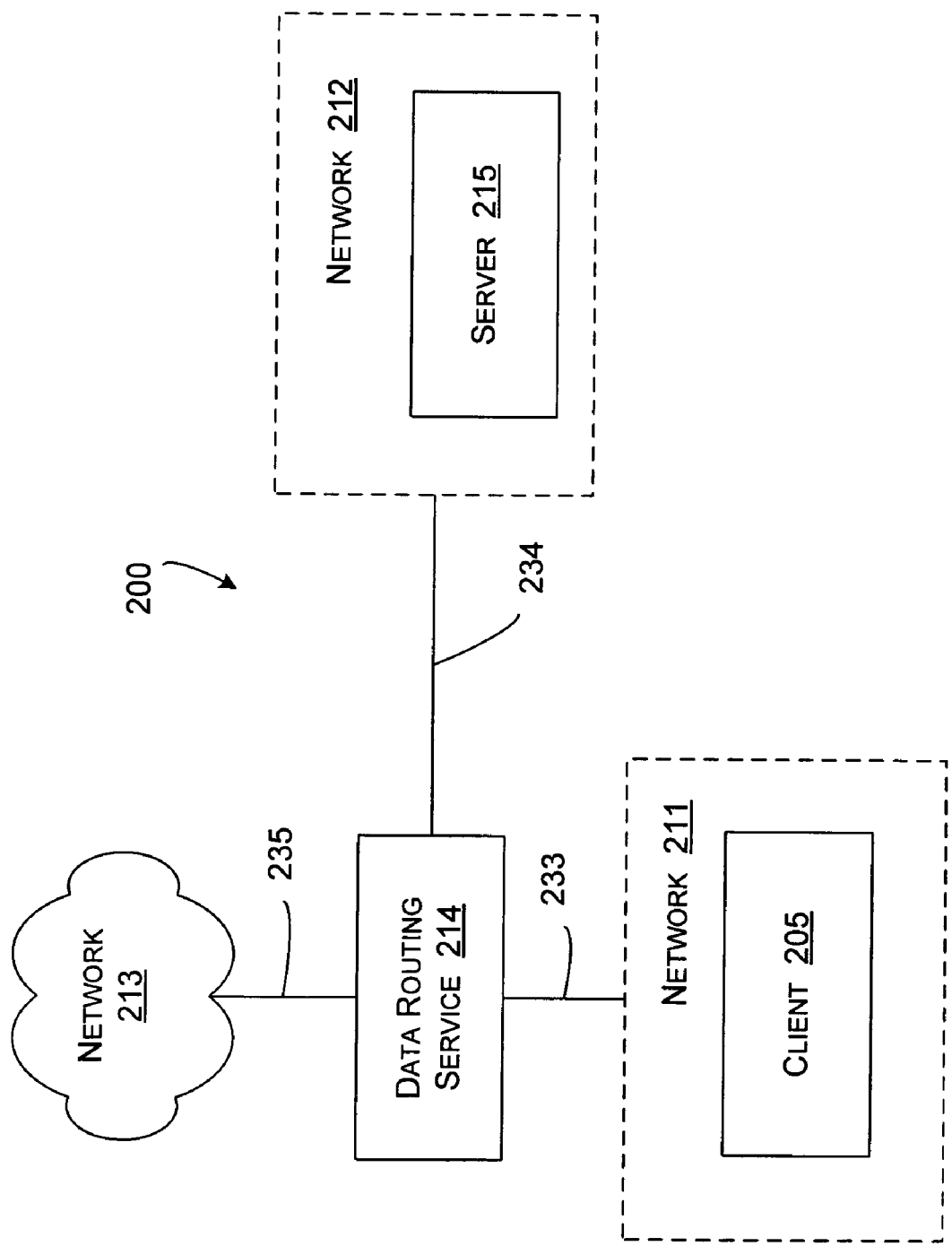
FIG. 2 is a schematic diagram generally illustrating an example high level network architecture in accordance with an embodiment of the invention.

FIG. 2 illustrates generally an example of a network architecture 200 that can provide access to a first network while restricting access to a second network (e.g., the Internet) in accordance with the 2004/0111520 published application. Network architecture 200 includes client 205 and server 215. Although not required, client 205 and server 215 may each be structured as described above for computer 110. The terms "client" and "server" are used herein to denote the fact that the client 205 receives a service, such as, for example, access to network 213, from the server 215. While client 205 and server 215 are a client and a server (respectively) in this context, the client 205 may act as a server in another context, and server 215 may act as a client in another context.

As depicted in network architecture 200, data routing device 214 is connected to network 211, network 212, and network 213 by corresponding logical communication links 233, 234, and 235 respectively. Data routing device 214 logically represents a computer system that can determine where to transfer data received from network 211, such as, for example, data received from client 205. That is, when data routing device 214 receives data from network 211, data routing device 214 can determine if the data is to be transferred to network 212 or network 213. As such, data routing device 214 can be configured to allow access to one network (e.g., network 212) while at the same time restricting access to another network (e.g., network 213). Data routing device 214 can make this determination using a variety of different techniques.

In some embodiments, access to resources located on network 213 can be restricted by the use of Virtual Local Area Networks ("VLANs"). In these embodiments, networks 211, 212 and 213 may each be a portion of a different VLAN. VLAN aware devices in network architecture 200 can "Tag" data frames to indicate to data routing device 214 where the data frames are to be routed. For example, when client 205 is not authorized to access resources located network 213, components in network 211 or logical communication link 233 can Tag data frames from client 205 indicating that the data frames are to be routed to server 215 (or other resources located on network 212). When client 205 is authorized to access network 213, components in network 211 or logical communication link 233 can Tag data frames from client 205 indicating that the data frames are to be routed to resources on network 213 (e.g., to the Internet) or to resources on network 212 (e.g., server 212) as appropriate.

In other embodiments, access to resources located on network 213 can be restricted by the use of Internet Protocol ("IP") filtering. Data routing device 214, components in network 211, or components in logical communication link 233 can filter Internet Protocol ("IP") address to limit client 205's access to resources with particular IP addresses. When client 205 is not authorized to access resources located on network 213, IP addresses can be filtered such that client 205 is exposed to IP addresses of resources located on network 212 but is not exposed to IP addresses of resources located on network 213. When client 205 is authorized to access network 213, IP addresses can be filtered such that client 205 is exposed to IP addresses of resources located on both networks 212 and 213. Alternately, when client 205 is authorized to access network 213 IP filtering may cease altogether.

In yet other embodiments, access to resources on network 213 can be restricted by use of a Virtual Private Network ("VPN"). When client 205 is not authorized to access resources located on network 213, a VPN can be configured such that client 205 is exposed to resources located on network 212, but is not exposed to resources located on network 213. When client 205 is authorized to access resources located on network 213, a VPN can be configured such that client 205 is exposed to resources located on both networks 212 and 213. Alternately, when client 205 is authorized to access resources located on network 213 use of a VPN may cease all together.

It should be understood that VLAN, IP filtering, and VPN techniques are merely examples of some of the techniques that can be used to differentiate between networks so as to allow access to one network while restricting access to another network. It should be understood that access to a single network can be limited using VLANs, IP filtering, or VPNs. For example, a server located on network 213 can provide client 205 with limited access to resources located on network 213. It would be apparent to one skilled in the art, after having reviewed this description, that other techniques, in addition VLAN, IP filtering, and VPN techniques, can be used to allow access to one network, while restricting access to another network.

It should be further understood that techniques used to restrict access to a network may also be used to provide limited access to a network. In some embodiments, a server on a network can provide a client with limited access to the network. For example, a server located on network 213 may implement IP filtering to provide client 205 with limited access to network 213. Included in the limited access can be access to computer systems or modules that store provisioning files needed for gaining full access to network 213. Client 205 can be authorized to download provisioning files from these computer systems or modules, while being denied access to other resources located on network 213.

The server 215 provides the client 205 with a Uniform Resource Identifier ("URI"), such as a Uniform Resource Locator (URL), to a master document that contains information for provisioning the client. The master document may contain further URIs to sub-files or other master documents. After receiving URIs, the client can automatically download or otherwise access any appropriate provisioning files. The master document and any associated sub-files can be defined in accordance with an extensible markup language, such as eXstensible Markup Language ("XML") schemas.

The provisioning service described in the 2004/0111520 published application is but one way to provide a master document and associated sub-files to the client 205, but for the purposes of this document, the files provisioned to the client are termed "language files" herein, whether the file provisioned is a master document or a sub-file. In addition, the language files may be provided to computer in another manner than the provisioning service described in the 2004/0111520 published application.

Figure 3:
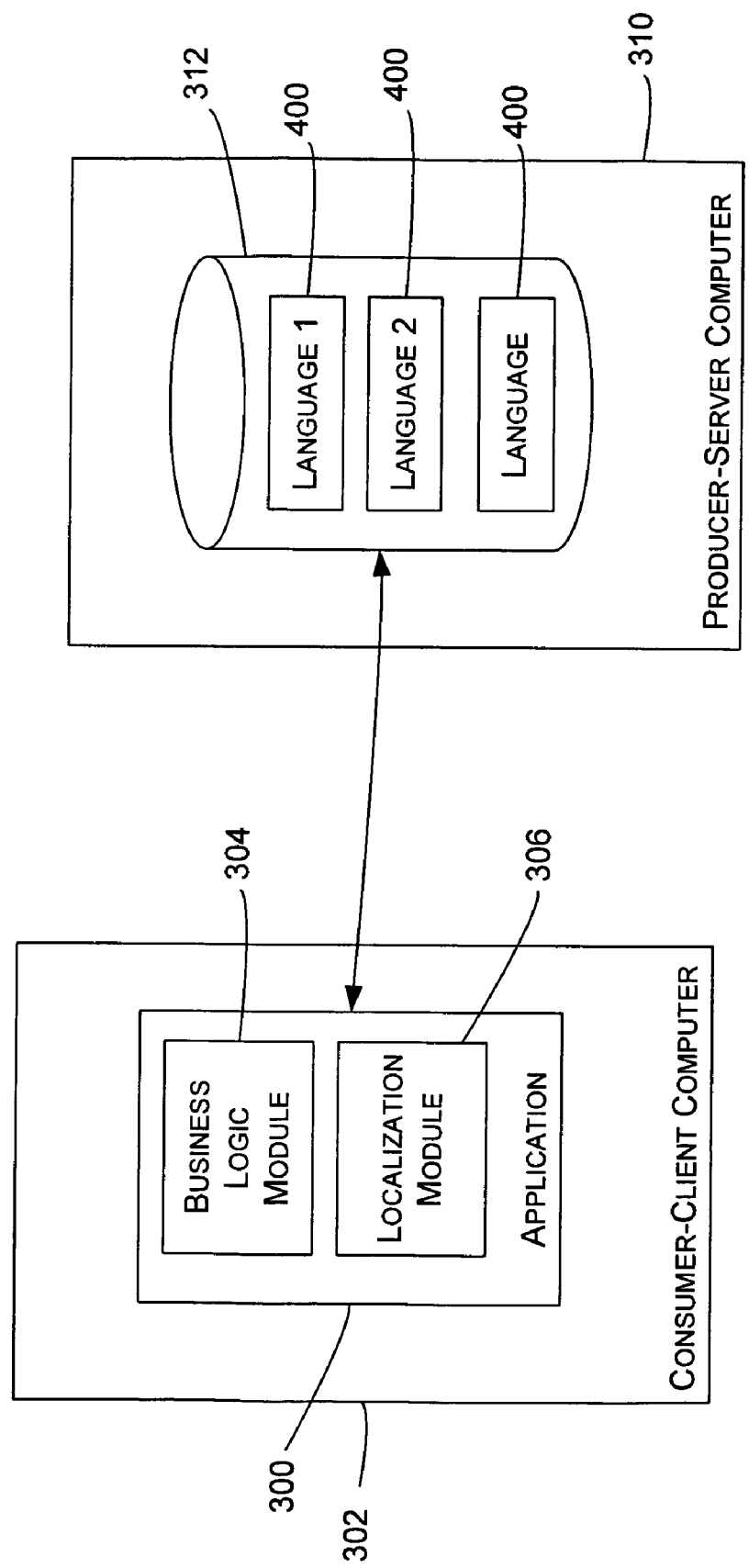
FIG. 3 is a diagrammatic representation of an architecture of an application 300 in accordance with an embodiment of the invention.

FIG. 3 is a representation of an architecture of an application 300 in accordance with an embodiment of the invention. The application is installed on a consumer-client computer 302 (e.g., the computer 110). In accordance with an embodiment, the application 300 is designed such that non-localized, typically, non-user interface, portions of the application are maintained in a business logic module 304. A second, localization module 306, is directed to localization, usually to user interface aspects of the application 300.

In accordance with an embodiment, language-dependant resources that are utilized by the application 300 are maintained remote from the application, for example on a producer-server computer 310. These language-dependant resources may be maintained, for example, in a database 312. In an embodiment, the language-dependant resources are stored as eXtensible Mark-up Language (XML) data and each similar group of data is organized into a single XML file.

Figure 4:
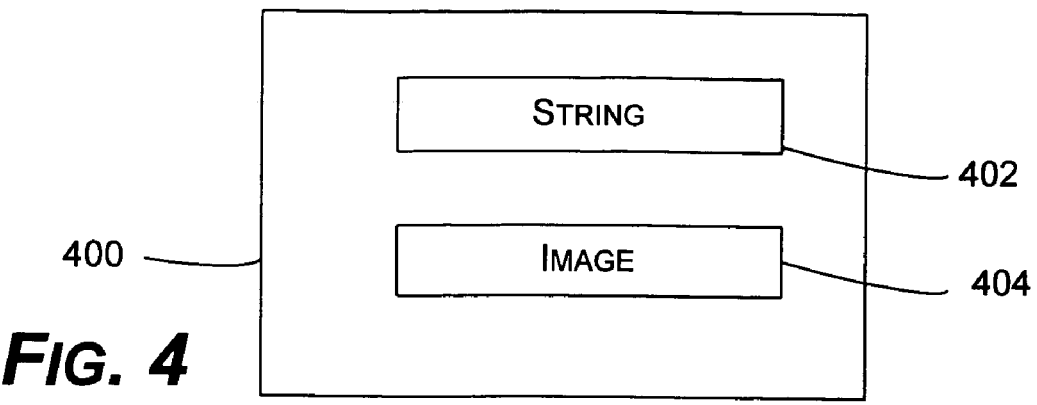
FIG. 4 is an example of a language resource file in accordance with an embodiment of the invention.

An example of a language resource file 400 is shown in FIG. 4. The language resource file 400 includes a string 402 and an image 404. The image or any other icon may be base-64 encoded into an XML file. Instead of the string 402 and the image 404, the language resource file 400 may include only one of these, or may alternatively or additionally include other resources.

In accordance with an embodiment, within the database 312 are stored a number of language resource files 400 as provided by the particular application vendor of the application 300. In an embodiment, for each language supported by the application vendor, language resource files 400 may include a generic language file, such as an English file, and multiple regional or locale specific sub-files, such as, in the English example, a United States English sub-file, a United Kingdom English sub-file, an Australian English sub-file, and a Canadian English sub-file. In the database 312, the generic language resource files 400 are depicted as $L_1, L_2 \ldots L_n$ with sub-files being $LS_1, LS_2$, etc. In the example shown, only one of the languages includes sub-files, but all or none may include such sub-files. It is likely that a software vendor will provide a number of different language resource files 400. However, in accordance with an embodiment, for consistency, each software vendor provides, at a minimum, an agreed-upon default language. In one embodiment, the default language is English, although other languages may be used.

The software vendor maintains the producer-server computer 310 and may update the language resource files at any time. In an embodiment, when updated, the version number of a language resource file 400 is updated. By separating the language resource files from the code for the application 300, the application vendor may update resources without having to update binaries for the application 300.

The language resource files 400 are supplied to the application 300 for use in localization, such as for display by a user interface. The processes for selecting language resource files 400 for download from the producer-server computer 310 and then selecting a particular file for use are described below.

Figure 5:
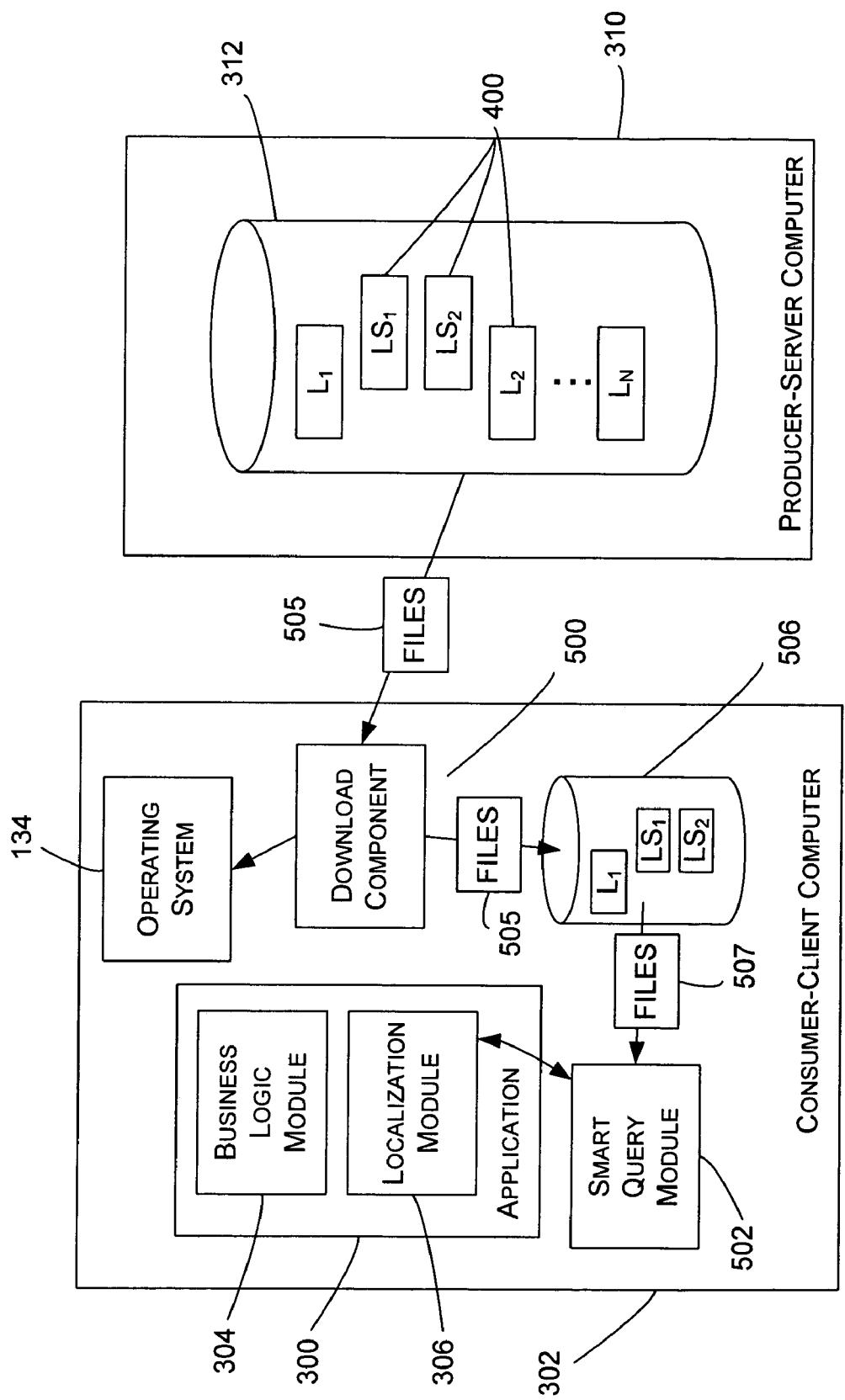
FIG. 5 is a FIG. 5 shows an architecture for an application including components that provide download of language resource files and then selection of the language resource files in accordance with an embodiment of the invention.

FIG. 5 shows an architecture for the application 300 including components that provide download of the language resource files 400 and then selection of the language resource files. In the embodiment shown, the application 300 includes or is otherwise associated with a download component 500 and a smart query module 502.

The download component 500 interacts with the database 312 to provide download of some or all of the language resource files 400, as indicated by the files 505. These language resource files 505 are downloaded and stored in a database 506 on the consumer-client computer 302.

Figure 6:
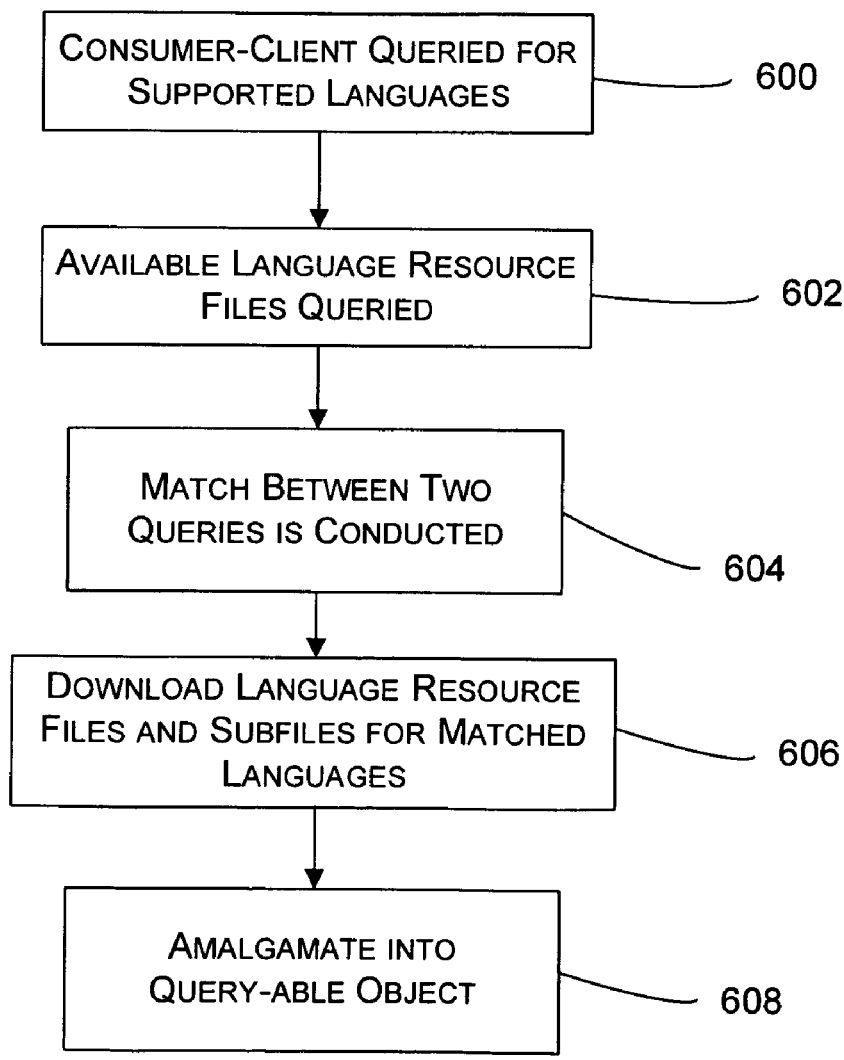
FIG. 6 shows steps for downloading language resource files in accordance with an embodiment of the invention.

FIG. 6 shows steps for downloading language resource files 400 in accordance with an embodiment of the invention. Beginning at step 600, the consumer-client computer 300 is queried for different language options. The download component 500 queries the consumer-client computer 302 to determine the languages supported by the consumer-client computer. These languages may be, for example, regional settings for the operating system 134 of the consumer-client computer 302, or language and/or localization settings otherwise selected by a logged-in user of the computer. As an example, the download component 500 may query regional options maintained within the operating system 134, such as a default user interface language for the computer. Other languages may be supported on the computer, depending upon the languages selected during set-up or changes made after set-up. The download component 500 may also query location information, such as the location of the computer (typically set by the user) to determine languages supported by the consumer-client computer 302.

At step 602, the download component 500 queries the database 312 for available language resource files 400. At step 604, a match is performed between the files found in step 600 and 602. In step 606, the language resource files 400 for the matched languages are downloaded. In accordance with an embodiment, for each language that is matched, the generic language resource file (e.g., $L_1$) and the regional language resource sub-files (e.g., $LS_1$ and $LS_2$) for that language are downloaded to the database 506.

In the downloading process shown in FIG. 6, when conducting the download, a secure operation may be performed. For example, each of the downloaded language resource files may be validated using an appropriate schema where predefined schema definitions exist relating to a resource category. Also, in accordance with an embodiment, during download the language resource files may be amalgamated into a query-able object (step 608), for example into an XML database store. The finalized downloadable product includes applicable language resource files for each language that can be supported by the consumer-client computer 302, and which may be queried by the smart query module 502.

The download component 500 may use similar steps to those shown in FIG. 6 to update already existing language resource files 400 in the database 506. If, for example, version information is maintained at the database 312, updates may be downloaded if version numbers have changed, and these updates may be amalgamated with the language resource files to form a new query-able object. In addition, if user settings for language and/or region have changed, new language resource files 400 may be matched. Updating may occur on a regular basis, for example once a week, upon request by the application 300, as a result of user setting changes, upon a user request, or may be pushed out by the producer-server computer 310.

Figure 7:
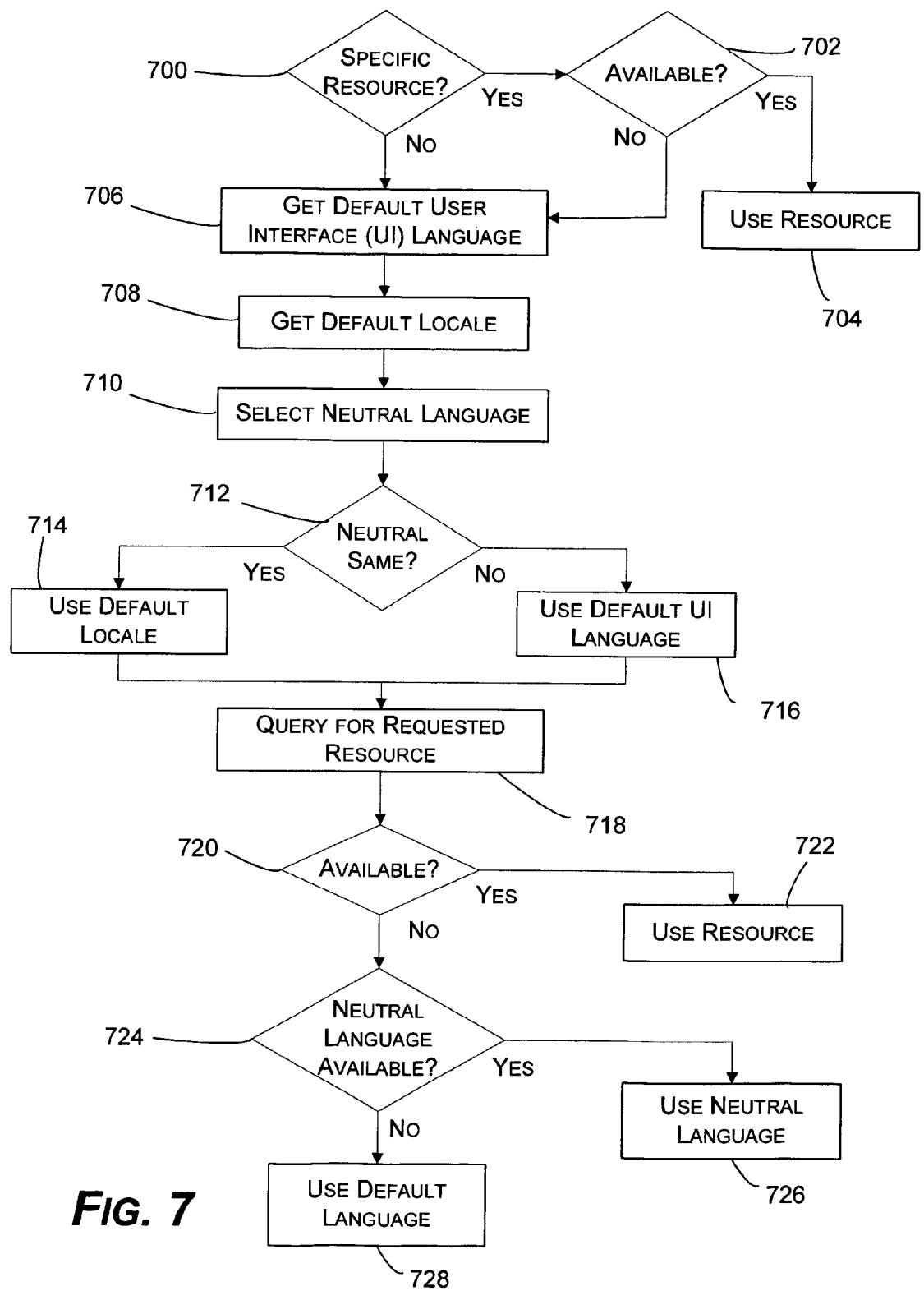
FIG. 7 shows steps for choosing language resources for display to a user in accordance with an embodiment of the invention.

The smart query module 502 queries the database 506 to determine the proper resources for the application 300 to display. In doing so, it selects files, indicated by the files 507, for the application 300. FIG. 7 shows steps for choosing language resources for display to a user in accordance with an embodiment of the invention. In the embodiment shown in the drawings, the smart query module 502 has the capability to query for language resources it would like displayed by the application 300.

At step 700, a determination is made whether a specific resource is requested, such as the smart query module 502 requesting a United States regional version of English. If so, step 700 branches to step 702, where a determination is made whether the specific resource is available. If available, step 702 branches to step 704, where the specific resource is used. As an example, the user may select a particular language with a regional preference, such as the French language in Canada (fr-ca), and if such language and regional preference is available, it is utilized in step 704.

If the specific resource is not available or a specific resource was not requested, then step 702 or step 704 branch to step 706, where a determination process begins for selecting a particular language resource for providing to a user. In this case, the application 300, and more specifically the smart query module 502, is absolved of the responsibility of picking the correct language resource. It is believed that this construct will be preferred by most software vendors.

At step 706, the default user interface language is obtained. Typically, this default user interface language is the user interface language set for the consumer-client computer 302.

At step 708, the default locale is obtained. The default locale is typically the location of the computer, and is often selected by a user. In the example above, most likely the user will typically be in Canada. However, if the user was to travel to France, the user may want to change the locale on the computer to the French version of the French language (fr-fr), thus changing the locale of the computer. Changing the locale in this manner may provide, for example, more localized resources, for example in display of numbers, currency, time, and dates.

At step 710, the neutral languages for the default locale and the default user interface language are selected. In the example above, the neutral languages would be French (fr) for both the French Canadian (fr-ca) and the French French (fr-fr) selections. There are situations in which there will be two different neutral languages. Step 712 evaluates whether the neutral languages are the same. If so, step 712 branches to step 714, where the default locale is picked. If the neutral languages are not the same, then step 712 branches to step 716, where the default user interface language is picked. In either event, step 714 or step 716 branches to step 718, where the smart query module 502 queries for the requested resource (e.g., the default locale or the default user interface language).

At step 720, a determination is made whether the requested resource is available. If so, then step 720 branches to step 722, where that resource is used by the application 300. If the resource is not available, then step 720 branches to step 724, where a determination is made whether a neutral language for the default local and the default user interface language is available. For example, in the example given above, the default language would be French, without a regional preference such as Canadian or French. If the neutral language is available, then step 724 braches to step 726, where the neutral language is used by the application 300. If the neutral language is not available, then step 724 branches to step 728, where the default language (e.g., in the examples given above, English) is used.

The algorithm provided in FIG. 7 instead provides a manner in which available languages may be matched to user preferences. The final step 728 in FIG. 7 provides at least some default language that will be presented to a user. In this manner, when the application 300 is used, at least something will be displayed to the user, although the user may not be able to read any language components that are provided. This ensures that at least something is displayed, at a last resort a default.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing multi-lingual and regional support for an application, the method comprising the steps of:
    installing an application on a computer, the application having a first logic module that is adapted to handle non-user interface components of the application, the application also having a localization module that is adapted to handle localization aspects of the application including a user interface logic;
    issuing a query to the computer to determine what languages are supported by the computer and whether any localized preferences for a particular language have been indicated by a user of the computer;

issuing a query to a server maintained at location remote from the computer for language resources that are available at the server;

determining if there are matches between the query issued to the computer and the query for language resources issued to the server;

downloading from the server to the computer language resource files for matched languages and any user-indicated localized preferences thereof;

wherein the language resource files are supplied to the localization module; wherein the downloaded language resources comprise generic files for a language and sub-files of the generic files, each of the sub-files representing a regional preference for the language;

amalgamating the downloaded language resource files into a queriable object;

storing version information of the downloaded language resources;

periodically querying the sever to see if any new versions of the downloaded language resources exist and, if so, then downloading the updated previously downloaded language resources.

2. The method of claim 1, wherein each one of the downloaded language resource files comprises an extensible markup language file.

3. The method of claim 1, wherein issuing a query to the server comprises determining whether there is a neutral language for a first language resource associated with the user interface language of the computer and a second language resource associated with the regional preference setting on the computer, if there is a neutral language, selecting the second language resource, if available; and if there is not a neutral language, then selecting the first language resource, if available.

4. The method of claim 3, further comprising, if there is a neutral language, selecting a third language resource associated with the neutral language if the second language resource is not available.

5. The method of claim 4, further comprising, if there is a neutral language, selecting a fourth language resource associated with a default language if the third and second language resources are not available.

6. The method of claim 5, wherein the default language comprises English.

7. The method of claim 3, further comprising, if there is not a neutral language, selecting a third language resource associated with a default language if the first language resource is not available.

8. The method of claim 7, wherein the default language comprises English.

9. A method for providing multi-lingual and regional support for an application, the method comprising the steps of:

installing an application on a computer, the application having a first logic module that is adapted to handle non-user interface components of the application, the application also having a localization module that is adapted to handle localization aspects of the application including a user interface logic;

issuing a query to the computer to determine what languages are supported by the computer and whether any localized preferences for a particular language have been indicated by a user of the computer;

issuing a query to a server maintained at location remote from the computer for language resources that are available at the server;

determining if there are matches between the query issued to the computer and the query for language resources issued to the server;

downloading from the server to the computer language resource files for matched languages and any user-indicated localized preferences thereof;

wherein the language resource files are supplied to the localization module;

amalgamating the downloaded language resource files into a queriable object;

storing version information of the downloaded language resources;

periodically querying the sever to see if any new versions of the downloaded language resources exist and, if so, then downloading the updated previously downloaded language resources;

wherein each one of the downloaded language resource files comprises an extensible markup language file; and wherein each extensible markup language file comprises generic files for a language and sub-files of the generic files, each of the sub-files representing a regional preference for the language.

* * * * *